No. 685,940. Patented Nov. 5, 1901.
E. W. PARRISH.
HORSE HAY RAKE.
(Application filed May 16, 1901.)
(No Model.)
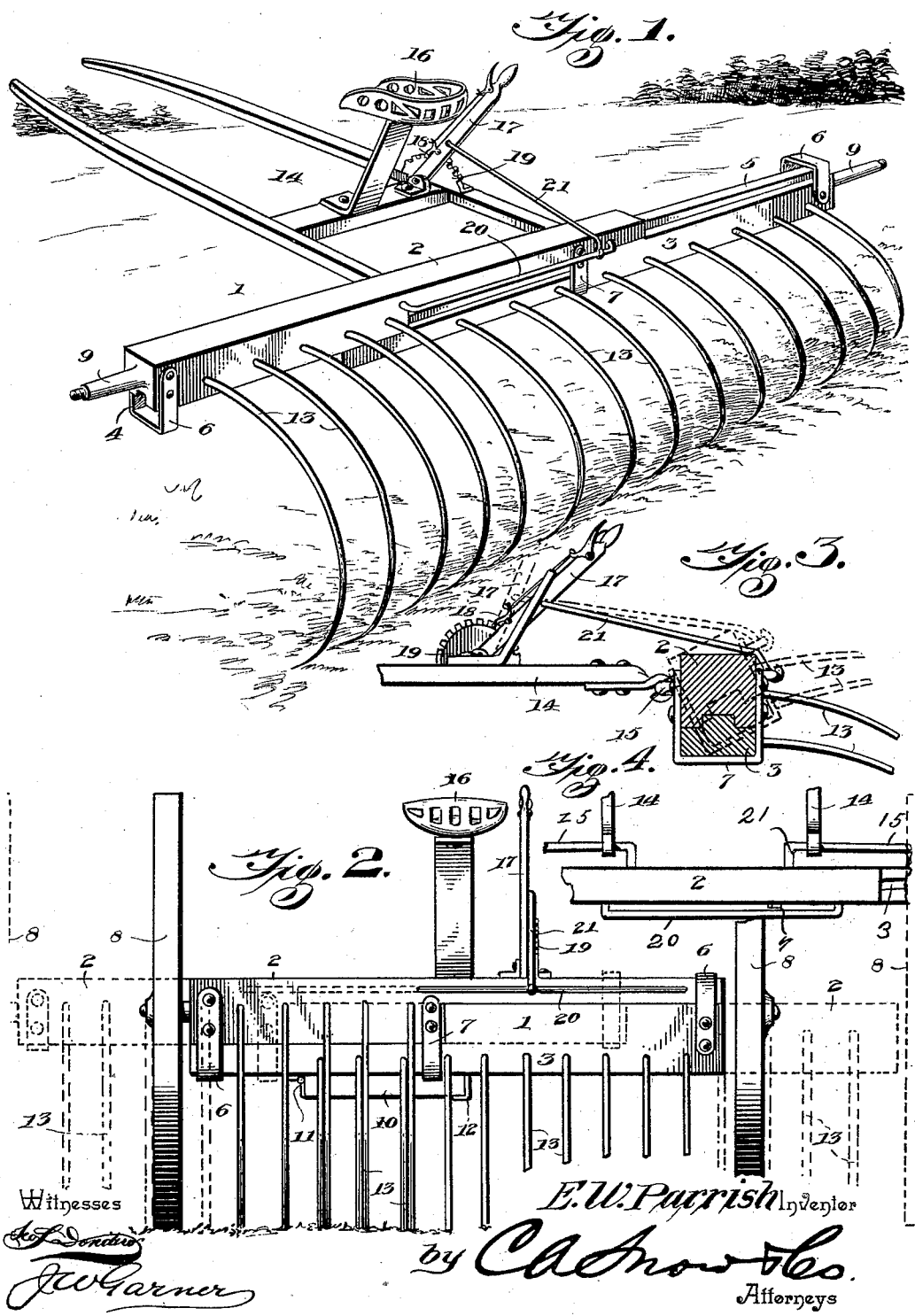

UNITED STATES PATENT OFFICE.

EDWARD W. PARRISH, OF HICO, KENTUCKY.

HORSE HAY-RAKE.

SPECIFICATION forming part of Letters Patent No. 685,940, dated November 5, 1901.

Application filed May 16, 1901. Serial No. 60,540. (No model.)

*To all whom it may concern:*

Be it known that I, EDWARD W. PARRISH, a citizen of the United States, residing at Hico, in the county of Calloway and State of Kentucky, have invented a new and useful Horse Hay-Rake, of which the following is a specification.

My invention is an improved horse hayrake; and it consists in the peculiar construction and combination of devices hereinafter fully set forth and claimed.

The object of my invention is to effect improvements whereby the rake may be narrowed when not in use to enable it to be readily drawn through narrow gateways and the like.

In the drawings, Figure 1 is a perspective view, with the wheels omitted, of a horse hayrake constructed in accordance with my invention, showing the same extended to its full width in operative position. Fig. 2 is a rear elevation of the same, showing the rake narrowed and in inoperative position. Fig. 3 is a detail sectional view taken through the axle, which also constitutes the rake-head. Fig. 4 is a detail top plan view of a portion of the axle and the connections between the same and the shafts or tongue.

The axle 1 comprises the sections 2 3, which overlap each other and are provided, respectively, on their opposing sides with a longitudinal rabbet 4 and a tongue 5, which fits in the same. Thereby the axle may be lengthened or shortened, as will be understood. The said axle-sections are provided at their ends with clips 6, which lock the outer ends of the sections together when the axle is shortened, as is shown in Fig. 2. A clip 7 is attached to the section 2 and passes around the section 3 and is disposed at or near the center of the axle when the same is shortened. The supporting-wheels 8 are journaled on the spindles 9 at the ends of the axle. A supporting-leg 10 is hinged to the section 3, as at 11, and is adapted to support the axle when one of the wheels is being removed. When not in use, the said supporting-leg is folded against the section 3 and is secured thereto by any suitable means, as by a turn-bolt 12, as shown in Fig. 2. The axle forms also the rake-head, the rake-teeth 13 being attached to the sections 2 3 thereof, as shown. Hence by turning the axle in the supporting-wheels the rake-teeth may be raised or lowered, as will be understood. The shafts 14 have their rear ends attached to members 15, with which the sections 2 3 of the axle, on the front sides thereof, are provided and with which the shafts have sliding engagement. Thereby the said sections of the axle may be shifted in lengthening or shortening the axle without affecting the shafts 14, as will be understood. A suitable tongue may of course be substituted for the shafts. The seat 16 for the driver is carried by the shafts or tongues, and a lever 17 is also carried thereby. The said lever is provided with the usual spring-pressed dog 18 and the shafts or tongue with the usual segment-plate 19, whereby the said lever may be locked in any desired position. On the rear side of one of the sections of the axle is a slide member 20 of suitable length. A rod 21, which operates on the said slide member, is attached to the said lever. Hence by this means the axle may be turned to raise or lower the rake-teeth.

Having thus described my invention, I claim—

1. In a horse hay-rake, the combination of an extensible axle, comprising overlapping telescopically-connected sections adjustable while in their telescopic relation to vary the length of the axle, rake-teeth attached to the said sections, a slide member on each of said sections, shafts or a tongue pivotally attached to and having sliding engagement with said members, whereby said sections are adapted to be shifted without affecting said shafts or tongue, and means to turn said axle and thereby raise or lower said rake-teeth.

2. In a horse hay-rake, the combination of an extensible axle comprising telescopically-connected sections adjustable while in their telescopic relation to vary the length of the axle, rake-teeth attached to said sections, a slide member on each of said sections, shafts or a tongue pivotally attached to and having sliding engagement with said members, whereby said sections are adapted to be shifted without affecting said shafts or tongue, a slide member 20 on one of said axle-sections, a lever mounted on the tongue or shafts, and a connection between said lever and said slide member 20, substantially as described.

3. In a horse hay-rake, the extensible axle comprising the overlapping sections, clips to connect the said sections together and a supporting-leg hinged to one of said sections, for the purpose set forth, substantially as described.

4. In a horse hay-rake, an extensible axle comprising overlapping telescopically-connected sections, adjustable while in their telescopic relation to vary the length of the axle, rake-teeth attached to said sections, shafts or a tongue slidably connected to the respective sections of the axle, and means to turn said axle and thereby raise or lower said rake-teeth, substantially as described.

In testimony that I claim the foregoing as my own I have hereto affixed my signature in the presence of two witnesses.

EDWARD W. PARRISH.

Witnesses:
J. H. KEYS,
W. P. GRAY.